(12) United States Patent
Takeshita et al.

(10) Patent No.: US 8,259,763 B2
(45) Date of Patent: Sep. 4, 2012

(54) LASER GAIN MEDIUM AND LASER OSCILLATOR USING THE SAME

(75) Inventors: Kenji Takeshita, Komaki (JP); Shinya Ishii, Yokohama (JP); Tomoko Saito, Nagoya (JP); Junji Kawanaka, Suita (JP); Noriaki Miyanaga, Suita (JP); Kazuo Imazaki, Nishi-ku (JP); Taku Saiki, Nishi-ku (JP); Hiroaki Furuse, Nishi-ku (JP)

(73) Assignees: Mitsubishi Heavy Industries, Ltd., Tokyo (JP); Osaka University, Osaka (JP)

( * ) Notice: Subject to any disclaimer, the term of this patent is extended or adjusted under 35 U.S.C. 154(b) by 0 days.

(21) Appl. No.: 13/241,740

(22) Filed: Sep. 23, 2011

(65) Prior Publication Data

US 2012/0008654 A1    Jan. 12, 2012

Related U.S. Application Data

(62) Division of application No. 12/509,090, filed on Jul. 24, 2009, now Pat. No. 8,068,523.

(30) Foreign Application Priority Data

Nov. 4, 2008    (JP) ................................ 2008-283642

(51) Int. Cl.
     *H01S 3/13*      (2006.01)

(52) U.S. Cl. .................................................... 372/29.01

(58) Field of Classification Search ................ 372/29.01
See application file for complete search history.

(56) References Cited

U.S. PATENT DOCUMENTS

| 6,144,484 | A | 11/2000 | Marshall |
| 6,268,956 | B1 | 7/2001 | Injeyan et al. |
| 2002/0176471 | A1 | 11/2002 | Peressini |

FOREIGN PATENT DOCUMENTS

| JP | 09-312430 | A | | 12/1997 |
| JP | 09312430 | A | * | 12/1997 |
| JP | 2006-237170 | A | | 9/2006 |
| WO | 94/05062 | A1 | | 3/1994 |

OTHER PUBLICATIONS

Russian Office Action dated Oct. 6, 2010 for Russian Application No. 2009128558/28 (039682).

\* cited by examiner

*Primary Examiner* — Patrick Stafford
(74) *Attorney, Agent, or Firm* — Sughrue Mion, PLLC (57) ABSTRACT

A laser gain medium includes an optical medium configured to transmit a laser beam and having an incident face, a first face, a second face opposing to the first face; and gain media configured to amplify the laser beam while reflecting the laser beam. At least one of the gain media is joined on a first face of the optical medium as a first face gain medium, and at least one of the remaining gain media is joined on a second face of the optical medium as a second face gain medium. The laser beam is incident into the optical medium, and is amplified by the first face gain medium and the second face gain medium while being alternately reflected by the first face gain medium and the second face gain medium.

9 Claims, 13 Drawing Sheets

EXCITATION POWER 1KW (SINGLE EXCITATION LIGHT SOURCE),
SPOT DIAMETER: 5mm, INCIDENT ANGLE: 60°

| LASER GAIN MEDIUM | | IN CASE OF THICKNESS OF 0.25 mm, AND CONSTANT CONCENTRATION OF 9.8 ATOM% | IN CASE OF THICKNESS AND CONCENTRATION ADJUSTED (EXAMPLES) |
|---|---|---|---|
| GAIN MEDIUM 1 | ABSORPTION QUANTITY | 600W (60%) | 330W (33%: 0.1mm, 9.8 ATM. %) |
| | TEMPERATURE DIFFERENCE | 76.3K | 16.3K |
| GAIN MEDIUM 2 | ABSORPTION QUANTITY | 240W (24%) | 260W (26%: 0.12mm, 9.8 ATM. %) |
| | TEMPERATURE DIFFERENCE | 12.3K | 15.6K |
| GAIN MEDIUM 3 | ABSORPTION QUANTITY | 96W (9.6%) | 200W (20%: 0.16mm, 9.8 ATM. %) |
| | TEMPERATURE DIFFERENCE | 2.0K | 16.0K |
| GAIN MEDIUM 4 | ABSORPTION QUANTITY | 38W (3.8%) | 130W (13%: 0.23mm, 9.8 ATM. %) |
| | TEMPERATURE DIFFERENCE | 0.31K | 15.4K |
| GAIN MEDIUM 5 | ABSORPTION QUANTITY | 16W (1.6%) | 80W (8%: 0.37mm, 20 ATM. %) |
| | TEMPERATURE DIFFERENCE | 0.05K | 15.6K |
| TOTAL OUTPUT | | 990W | 1000W |

Fig. 12

EXCITATION POWER 500W (TWO EXCITATION LIGHT SOURCES),
SPOT DIAMETER: 5mm, INCIDENT ANGLE: 60°

| LASER GAIN MEDIUM | | IN CASE OF THICKNESS IN OF 0.4 mm, AND CONSTANT CONCENTRATION OF 9.8 ATOM% | IN CASE OF THICKNESS AND CONCENTRATION ADJUSTED (EXAMPLES) |
|---|---|---|---|
| GAIN MEDIUM 1 | ABSORPTION QUANTITY | 400W (80%) | 236W (0.16mm, 9.8 ATM. %) |
| | TEMPERATURE DIFFERENCE | 81.5K | 19.3K |
| GAIN MEDIUM 2 | ABSORPTION QUANTITY | 80W (16%) | 201W (0.18mm, 20 ATM. %) |
| | TEMPERATURE DIFFERENCE | 16.3K | 18.4K |
| GAIN MEDIUM 3 | ABSORPTION QUANTITY | 32W (3.2%X2) | 116W (0.33mm, 20 ATM. %) |
| | TEMPERATURE DIFFERENCE | 6.5K | 19.5K |
| GAIN MEDIUM 4 | ABSORPTION QUANTITY | 80W (16%) | 201W (0.18mm, 20 ATM. %) |
| | TEMPERATURE DIFFERENCE | 16.3K | 18.4K |
| GAIN MEDIUM 5 | ABSORPTION QUANTITY | 400W (80%) | 236W (0.16mm, 9.8 ATM. %) |
| | TEMPERATURE DIFFERENCE | 81.5K | 19.3K |
| TOTAL OUTPUT | | 992W | 990W |

LASER GAIN MEDIUM AND LASER OSCILLATOR USING THE SAME

This is a Divisional application of U.S. Ser. No. 12/509,090 filed Jul. 24, 2009, which claims priority from Japanese Patent application No. 2008-283642 filed Nov. 4, 2008, the disclosures of which are incorporated by reference in their entirety.

TECHNICAL FIELD

The present invention is related to a laser, and more particularly, to a structure of a laser gain medium, a laser oscillator using the laser gain medium.

BACKGROUND ART

In recent years, a laser apparatus which has a small size but high output power and high beam quality is demanded in a laser machining field and so on. Conventionally, a gas laser has been widely used for a high output power laser, from the viewpoint of the output and the beam quality. However, recently, a laser diode (LD) pumping solid-state laser which uses laser diodes as excitation light sources has spread rapidly.

In order to realize a high output power laser by using the solid-state laser, discharge of heat generated in the laser gain medium is important.

Figure 1:
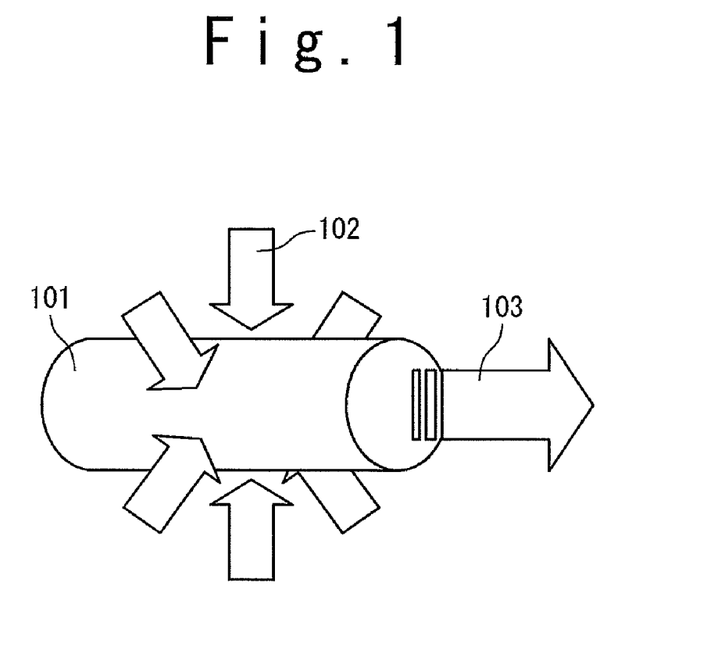
FIG. 1 is a diagram showing a conventional rod-type solid-state laser system.

FIG. 1 shows a rod-type solid-state laser system. Pumping light beams 102 are irradiated on the cylindrical side face of a rod-type laser gain medium 101 and an amplified laser beam 103 is outputted from one of the rod ends. In the laser system of this type, a temperature gradient is generated inside the laser gain material rod 101 in a radial direction. This temperature gradient causes degradation of the quality of the laser beam and a laser output drop. Also, it is necessary to consider the durability of laser gain medium to the temperature gradient and to restrain the output power. Moreover, it is difficult to realize the laser gain medium of a large diameter rod from the viewpoint of crystal growth and there is a limit in realization of high output power.

A slab laser system using a plate-type laser gain medium has been devised to reduce the above-mentioned temperature gradient in the rod-type laser gain medium. In this type of laser system, laser light beam propagates in a zigzag manner while being fully reflected in the laser gain medium and is amplified. In this slab laser system, even if the temperature gradient is generated in the laser gain medium, the influence of the temperature gradient on the laser beam can be canceled since the laser beam propagates in the zigzag manner in the temperature gradient.

Figure 2:
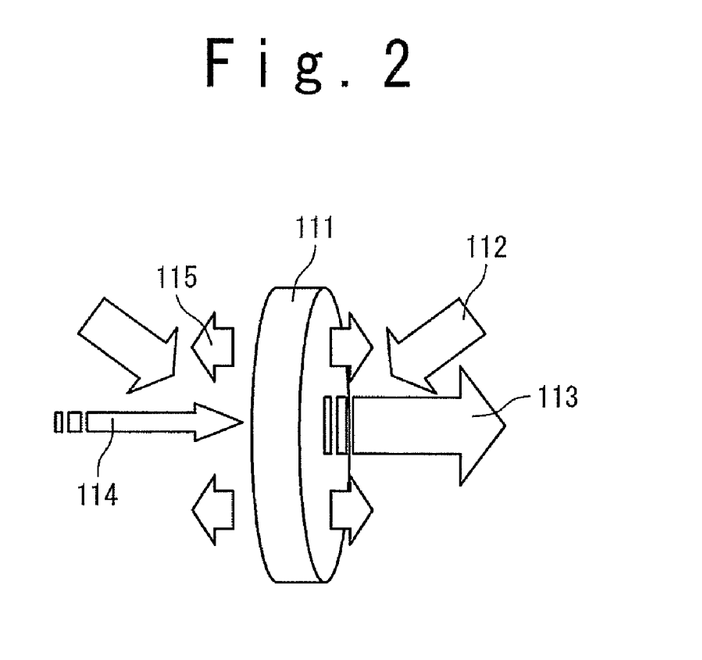
FIG. 2 is a diagram showing a conventional transmission-type disk-type laser system.

A method using a disk-type laser gain medium is known in order to solve a heat problem peculiar to the solid-state laser system. FIG. 2 shows a laser system of a transmission type as an example of the disk-type laser system. A pumping light beam 112 is irradiated to a thin disk-type laser gain medium 111 from outside. A laser beam 114 is supplied from one of the faces of the laser gain medium 111 and a laser beam 113 which has been amplified is outputted from the other face. In this laser system, by employing the laser gain medium of thin disk type, the area of a reception face of the pumping light beam can be made large. Moreover, it is possible to uniformly cool the whole disk face, and generation of the temperature gradient of the laser gain medium can be suppressed.

Figure 3:
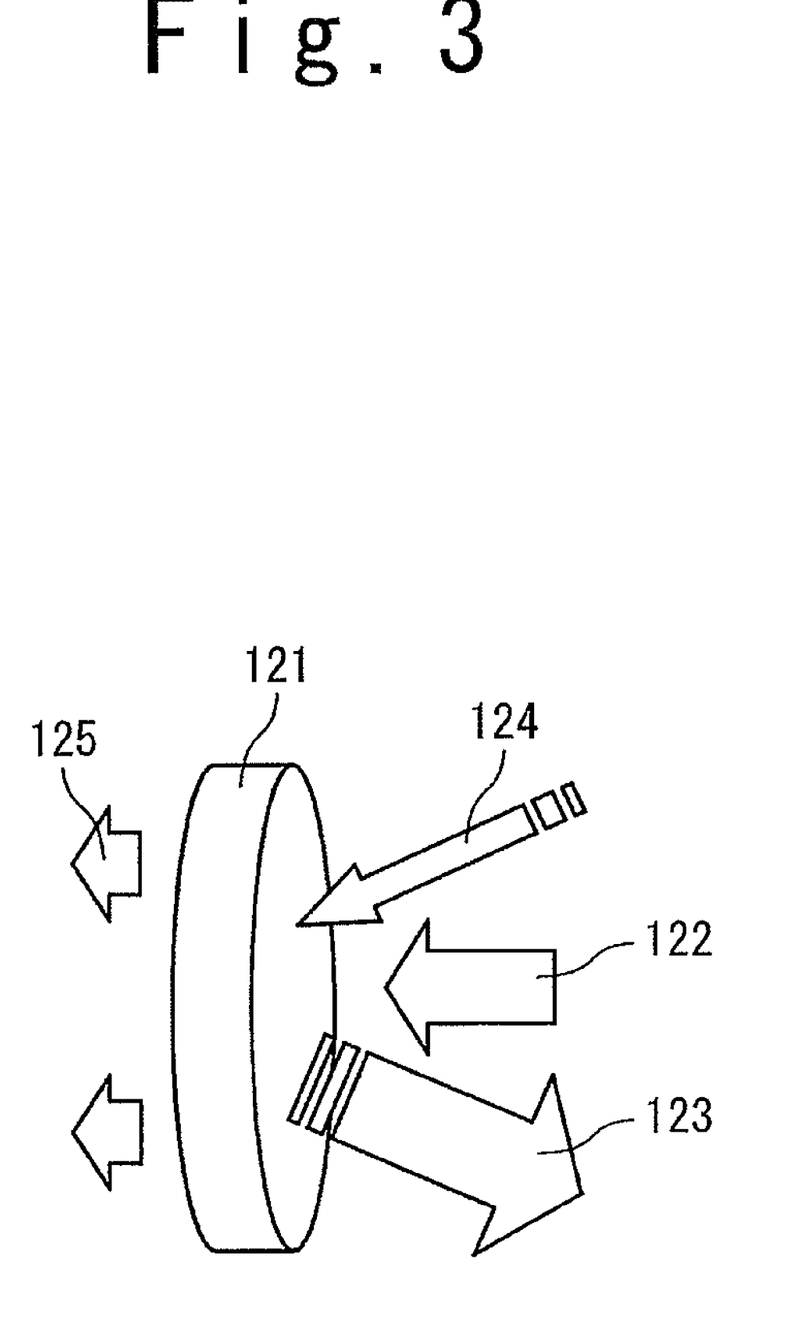
FIG. 3 is a diagram showing a conventional reflection-type disk-type laser system.

The disk-type laser systems are mainly divided into a transmission type laser system shown in FIG. 2 and a reflection type (an active mirror type) laser system shown in FIG. 3, depending on a method of amplifying the laser beam.

In the transmission-type solid-state laser system, the temperature in the disk rises with irradiation of the pumping beam 112 to the disk-type laser gain medium 111 so that the temperature gradient is generated. In order to eliminate the temperature rising and the temperature gradient, coolant is supplied to the front and back faces of the disk for heat radiation 115. In the transmission-type solid-state laser system, the laser beam which has passed through the coolant is outputted. For this reason, problems such as warp of the outputted laser beam and limitation on operation (for example, stop the supply of the coolant during the laser oscillation) are caused.

On the other hand, in the active mirror type solid-state laser system shown in FIG. 3, one of the faces of a disk-type laser gain medium 121 is covered with a reflection film, a laser beam 123 is inputted from the face opposite to the reflection film and is outputted. By providing a heat discharging mechanism on the whole face covered with the reflection film, the heat accumulated in the laser gain medium can be efficiently discharged as radiation 125. It is possible to output the amplified laser beam without undergoing influence of the heat discharging mechanism. Also, comparing with the transmission-type laser system, since an optical path of the laser beam is folded, the laser beam can be amplified additionally for one return path. Therefore, when disks with the same shape are used, there is an advantage in larger amplification of the laser beam in the reflection type than in the transmission type.

In conjunction with the above description, the following references are known: Japanese Patent Application Publications (JP-A-Heisei 9-312430 and JP-P2006-237170).

In above-mentioned solid-state laser system, a great deal of heat is generated in the laser gain medium with the optical excitation and the temperature of the laser gain medium rises. Therefore, in order to operate the laser system continuously, it is necessary to cool the laser gain medium to discharge the generated heat.

However, since the thermal conductivity of the solid-state laser gain medium is generally low, the large temperature gradient is caused between the hot inside portion and the cooled surface portion. For this reason, phenomena such as inclination of refractive index, mechanical stress, depolarization, and detuning could happen. As a result, it easily causes the degradation of beam quality, reduction of laser output, and the break-down of the solid-state laser medium. This would cause a large problem when extending the solid-state laser to the high output power.

In the large output power laser, a great deal of energy has to be amassed in the laser gain medium. On the other hand, a technique is known in which multi-stage amplification is applied to attain a large gain. In this case, because laser gain media are independent, the light axis of an input laser beam to be amplified is easily shifted due to mechanical vibration of the laser.

In order to obtain a laser beam of high beam quality, it is required that the laser beam is amplified uniformly in a region of the laser gain medium through which the laser beam propagates. In addition, it is required that a temperature is uniform among gain media, since a temperature gradient is generated as the whole laser gain medium so that adverse influence is given on laser oscillation when the temperature of the laser gain medium largely varies due to the heat through absorption of a pumping light beam.

SUMMARY

A subject matter of the present invention is to provide a technique for generating a laser beam with high quality and high output power while suppressing adverse influence of heat generation in gain media.

In an aspect of the present invention, a laser gain medium includes an optical medium configured to transmit a laser beam and having an incident face, a first face, a second face opposing to the first face; and gain media configured to amplify the laser beam while reflecting the laser beam. At least one of the gain media is joined on a first face of the optical medium as a first face gain medium, and at least one of the remaining gain media is joined on a second face of the optical medium as a second face gain medium. The laser beam is incident into the optical medium, and is amplified by the first face gain medium and the second face gain medium while being alternately reflected by the first face gain medium and the second face gain medium.

In another aspect of the present invention, a laser oscillator includes an optical resonator having an input side reflection mirror and an output side reflection mirror, a laser gain medium arranged between the input side reflection mirror and the output side reflection mirror; and a pumping light source configured to supply a pumping light beam to the laser gain medium. The laser gain medium includes an optical medium configured to transmit a laser beam and the pumping light beam and having an incident face, a first face, a second face opposing to the first face; and gain media pumped by the pumping light beam and configured to amplify the laser beam while reflecting the laser beam. At least one of the gain media is joined on a first face of the optical medium as a first face gain medium, and at least one of the remaining gain media is joined on a second face of the optical medium as a second face gain medium. The pumping light beam is incident from the pumping light source into the optical medium, and pumps each of the first and second face gain media through an optical path. The laser beam is propagated on the optical path and is amplified in the optical resonator by the first face gain medium and the second face gain medium while being alternately reflected by the first face gain medium and the second face gain medium.

In still another aspect of the present invention, a laser oscillator includes an optical resonator having an input side reflection mirror and an output side reflection mirror; and a laser gain medium arranged between the input side reflection mirror and the output side reflection mirror. The laser gain medium includes an optical medium configured to transmit a laser beam and a pumping light beam and having an incident face, a first face, a second face opposing to the first face, and gain media pumped by the pumping light beam and configured to amplify the laser beam while reflecting the laser beam. At least one of the gain media is joined on a first face of the optical medium as a first face gain medium, and at least one of the remaining gain media is joined on a second face of the optical medium as a second face gain medium. The laser oscillator further includes a pumping light source provided for each of the gain media and configured to supply the pumping light beam to each of the gain media. The laser beam is propagated on the optical path and is amplified in the optical resonator by the first face gain medium and the second face gain medium while being alternately reflected by the first face gain medium and the second face gain medium.

In yet still another aspect of the present invention, a laser oscillator includes a laser gain medium; an pumping light source configured to supply a pumping light beam to the laser gain medium; a laser beam source configured to supply a laser beam; an input optical system configured to lead the laser beam on an optical path on which the pumping light beam propagates; and an output optical system configured to lead the laser beam into a direction different from the optical path. The laser gain medium includes an optical medium configured to transmit the laser beam and the pumping light beam and having an incident face, a first face, a second face opposing to the first face; and gain media pumped by the pumping light beam and configured to amplify the laser beam while reflecting the laser beam. At least one of the gain media is joined on a first face of the optical medium as a first face gain medium, and at least one of the remaining gain media is joined on a second face of the optical medium as a second face gain medium. The pumping light beam is incident from the pumping light source into the optical medium by the input optical system, and pumps each of the first and second face gain media through the optical path. The laser beam is propagated on the optical path and is amplified by the first face gain medium and the second face gain medium while being alternately reflected by the first face gain medium and the second face gain medium, and the amplified laser beam is outputted through the output optical system.

In another aspect of the present invention, a laser oscillator includes a laser gain medium; an pumping light source configured to supply a pumping light beam; a laser beam source configured to supply a laser beam; a laser beam optical system configured to lead the laser beam to the laser gain medium; and a pumping light beam optical system configured to lead the pumping light beam to the laser gain medium. The laser gain medium includes an optical medium configured to transmit the laser beam and the pumping light beam and having an incident face, a first face, a second face opposing to the first face; and gain media pumped by the pumping light beam and configured to amplify the laser beam while reflecting the laser beam. At least one of the gain media is joined on a first face of the optical medium as a first face gain medium, and at least one of the remaining gain media is joined on a second face of the optical medium as a second face gain medium. The pumping light beam is incident from the pumping light source into the optical medium by the pumping light beam optical system, and pumps each of the first and second face gain media through an optical path. The laser beam is propagated on the optical path and is amplified by the first face gain medium and the second face gain medium while being alternately reflected by the first face gain medium and the second face gain medium.

Therefore, according to the present invention, it becomes possible to generate the laser beam with the high quality and the high output power without adverse influence of heat generation in gain media.

DESCRIPTION OF THE PREFERRED EMBODIMENTS

Hereinafter, a laser system according to the present invention will be described with reference to the attached drawings.
[First Embodiment]

Figure 4:
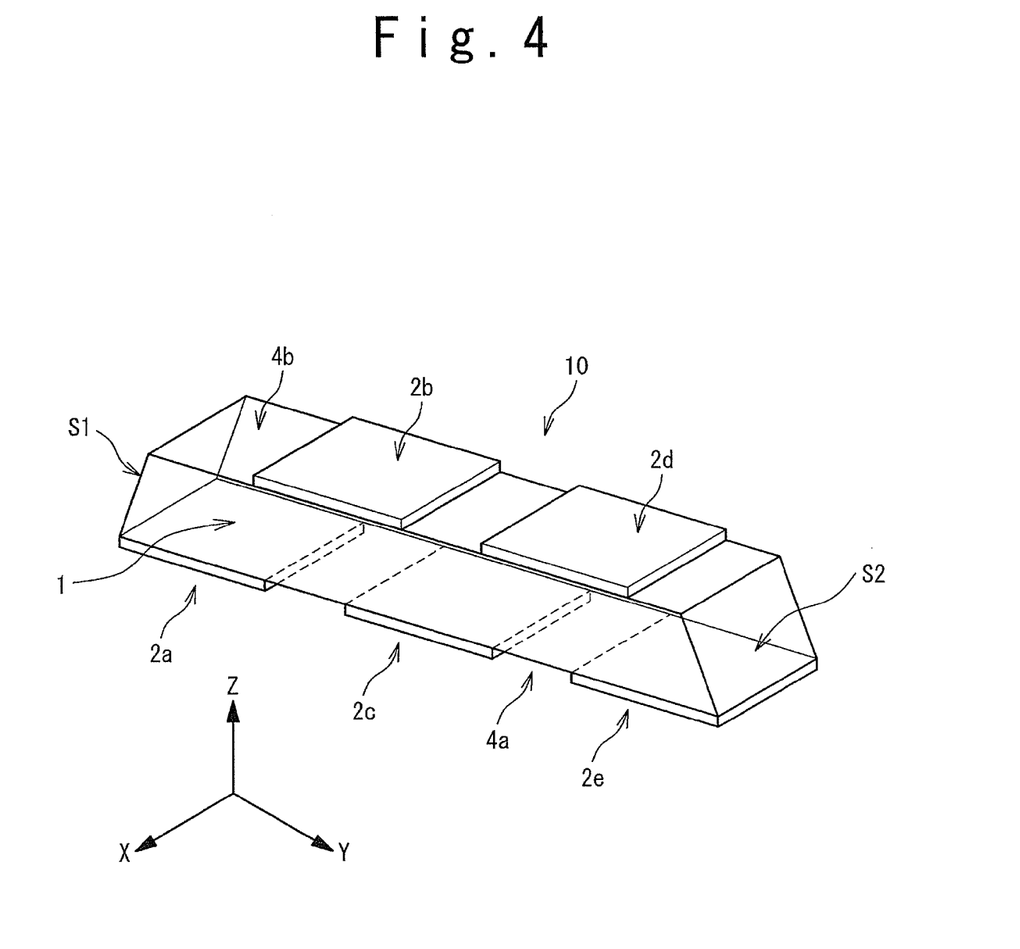
FIG. 4 is a perspective view showing a laser gain medium used in a laser system according to the present invention.

FIG. 4 is a perspective view showing a structure of a laser gain medium used in a laser system according to a first embodiment of the present invention. A laser gain medium 10 is of a composite type in which an optical medium 1 and a plurality of gain media 2a to 2e are combined.

The optical medium 1 is formed of the same optical ceramic material as those of the plurality of gain media 2a to 2e but is not doped with active elements such as Nd and Yb which contribute to amplification of a laser beam. The optical medium 1 has two side faces parallel to the YZ plane and opposite to each other. Each of the side faces has a trapezoidal shape which has a lower side and an upper side in a Z-axis direction and oblique sides in ends of the optical medium 1. The optical medium 1 has a flat top face 4b which is connected with the two upper sides of the two trapezoidal shapes. The top face 4b is parallel to an XY plane. The optical medium 1 has a flat bottom face 4a which is connected with the two lower sides of the two trapezoidal shapes. The bottom face 4a is parallel to the XY plane and is opposite to the top face 4b. The optical medium 1 has a first oblique end face S1 which is connected with the flat top face 4b, the bottom face 4a, and two oblique sides of the trapezoidal shapes. The first end face S1 is formed to have a predetermined tilt angle which is smaller than 90 degrees with respect to the bottom face 4a. The optical medium 1 has a second end face S2 which is flat and connected with the top face 4b, the bottom face 4a, and the two remaining oblique sides of the two trapezoidal shapes. The second end face S2 is formed to have a predetermined tilt angle which is smaller than 90 degrees with respect to the bottom face 4a. These tilt angles are selected and set to suppress reflection at the end faces when a pumping light beam or a laser beam is incident to a zigzag shaped optical path.

The plurality of gain media 2b and 2d are joined with the top face 4b of the optical medium 1. At least one active element is doped into the gain media 2b and 2d to contribute to the amplification of the laser beam. The plurality of gain media 2a, 2c and 2e are joined with the bottom face 4a of the optical medium 1. At least one active element is doped into the gain media 2a, 2c, and 2e to contribute to the amplification of the laser beam. Each of the gain media 2a to 2e is of a slab type (thin plate).

The gain media 2a to 2e are formed of ceramic, crystal and so on of yttrium aluminum garnet (YAG) as the optical material and are doped with active elements such as Nd and Yb. The laser gain medium 10 is a member of a composite type in which the optical medium 1 and the gain media 2a to 2e are joined with each other in sintering. Or, the optical medium 1 and the gain media 2a to 2e may be joined by means of adhesive material, optical joining material and so on. An optical deviation does not occur in the laser gain medium 10 even when mechanical vibration is applied to the laser gain medium 10, since the optical medium 1 and the gain media 2a to 2e are coupled to each other to be unified.

A large-sized laser gain medium suitable for a high output laser becomes possible by using a ceramics material for the laser gain medium. In this way, the pumping area can be extended. Also, it is possible to make the gain media absorb a pumping light beam of a large light intensity due to high heat resistance property of the ceramics material.

Figure 5:
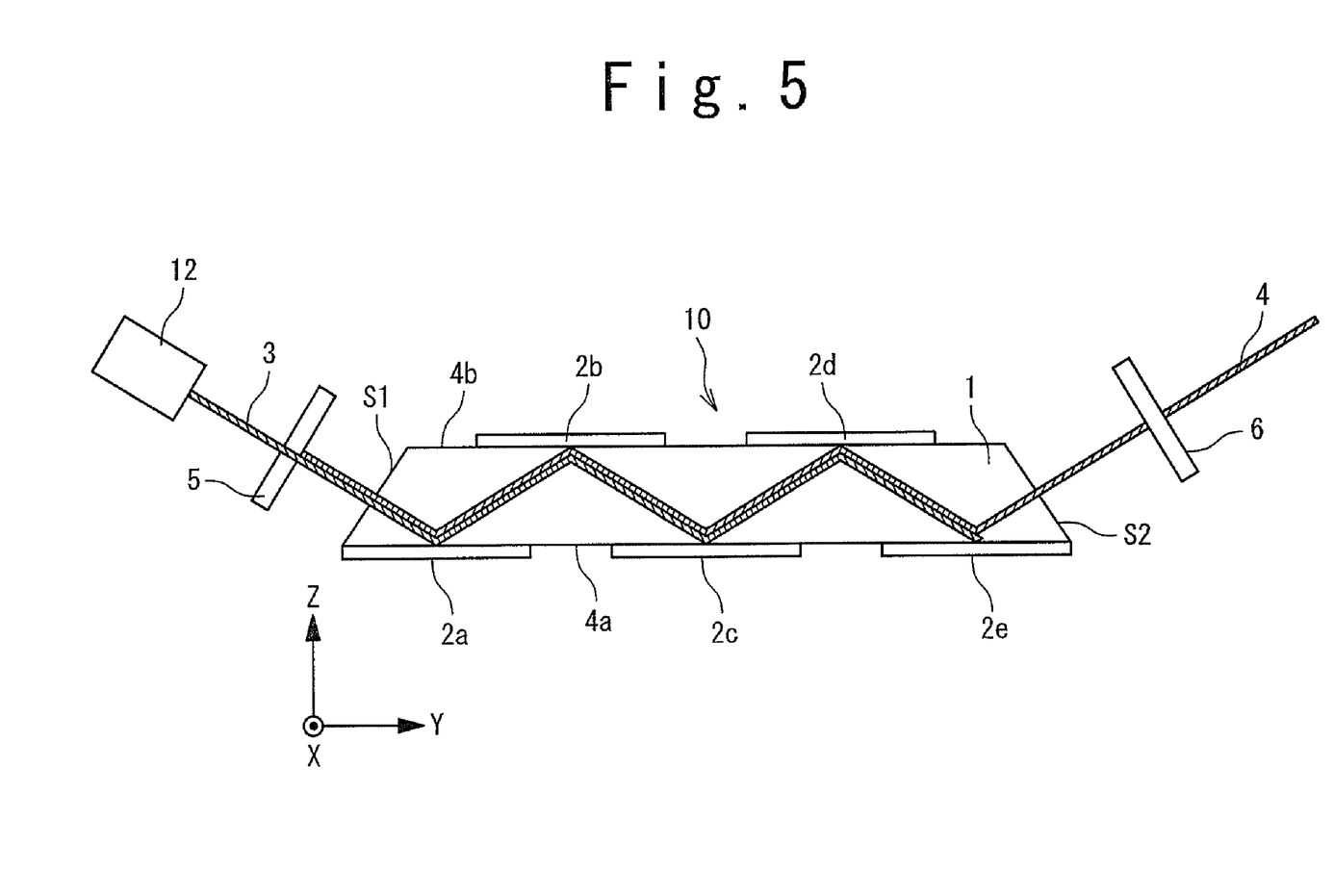
FIG. 5 is a sectional view showing the behavior of a laser oscillator using the laser gain medium in the first embodiment of the present invention.

FIG. 5 is a sectional view showing the behavior of a laser oscillator using the laser gain medium 10 in the first embodiment. The laser oscillator is provided with an optical resonator which includes a laser beam full reflection mirror 5 as an input side reflection mirror and an output mirror 6 as a reflection mirror on the output side. The laser gain medium 10 is arranged between the laser beam full reflection mirror 5 and the output mirror 6.

A pumping light beam 3 outputted from a pumping light source 12 transmits through the laser beam full reflection mirror 5 and is incident on the end face S1. The incident pumping light beam 3 inputted to the end face S1 is reflected alternately by the gain media 2a, 2c, and 2e joined with the bottom face 4a and the gain media 2b and 2d joined with the top face 4b to form a zigzag optical path. That is, the incident pumping beam 3 is reflected sequentially by the gain media 2a, 2b, 2c, 2d and 2e to form the zigzag optical path. The pumping light beam 3 is reflected by one of faces (hereinafter, to be referred to as a back face) of each of the gain media 2a to 2e opposing to the face joined with the optical medium 1. For example, each of the gain media 2a, 2c, and 2e joined with the bottom face 4a of the optical medium 1 has as a reflection face, the back face opposite to the bottom face 4a of the optical medium 1. Each of the gain media 2b and 2d joined with the top face 4b of the optical medium 1 has as a reflection face, the back face opposite to the top face 4b of the optical medium 1. High reflection coating may be applied to these reflection back faces. Preferably, the gain media 2a to 2e are arranged on such positions that the pumping light beam 3 propagating on the zigzag optical path is fully reflected, without applying the high reflection coating. The structure of the laser gain medium 10 in which the full reflections are used can be realized by adjusting the incidence angle of the pumping light beam 3 to the first end face S1 and the arrangement of the gain media 2a to 2e.

When propagating in the optical medium 1, the pumping light beam 3 is not absorbed. The pumping light beam 3 enters each of the gain media 2a to 2e from the bottom face 4a or the top face 4b in the optical medium 1, is absorbed by each of the gain media 2a to 2e, is reflected on the back face of the gain medium, and is again returned to the optical medium 1 through the top face 4b or the bottom face 4a. Since the pumping light beam 3 is not absorbed inside the optical medium 1, the optical medium 1 itself does not generate heat. The gain media 2a to 2e generates heat through absorption of the pumping light beam 3 but have the shape of thin plates. Accordingly, when the back faces of the gain media 2a to 2e are cooled, they are efficiently and uniformly cooled. The heat which is generated from the gain media 2a to 2e diffused into the optical medium 1, to ease heat lens effect and heat double refraction.

A heat sink or a cooling unit in which liquid-nitrogen and so on flows through a flow path, may be provided around the laser gain medium 10. This cooling unit cools the back faces of the gain media 2a to 2e at least.

Generally, in many cases, the heat transfer rate of a high reflection coating film is not high. Therefore, when the back faces of the gain media 2a to 2e are not applied with a high reflection protective coating film, and fully reflect the pumping light beam 3, the heat conduction is good and the cooling can be carried out more efficiently.

The pumping light beam 3 is absorbed by the gain media 2a to 2e of the laser gain medium 10. The laser beam which is supplied from a laser beam source (not shown) and which is amplified through the absorption of the pumping light beam resonates between the laser beam full reflection mirror 5 and the output mirror 6 and is outputted as the laser beam 4 from the laser gain medium 10 through the output mirror 6.

The temperature rising caused by the absorption of the pumping light beam in each of the gain media 2a to 2e is made constant. It is possible to realize this based on the different thicknesses of the gain media and/or difference dope quantities of active element(s).

The plurality of gain media are joined on the top face 4b and the bottom face 4a of the optical medium 1 in the present embodiment. In the examples of FIGS. 4 and 5, the three gain media 2a, 2c and 2e are joined on the bottom face 4a and the two gain media 2b and 2d are joined on the top face 4b. By employing such a structure, it is easy to give different adjusted gains to the gain media which are arranged on the different positions on the optical path. An example of the gains of gain media 2a to 2e is shown below. It is adjusted for the temperature rising due to the heat generated by the pumping light beam absorption in each gain medium to be approximately uniform.

The pumping light beam 3 is stronger in a nearer position to the pumping light source 12 on the optical path. Therefore, when the pumping light beam 3 is incident on one of the gain media which have identical characteristics, the gain medium on the nearer position to the pumping light source 12 has a larger generated heat. As in the present embodiment, by adjusting the thicknesses of gain media 2a to 2e or the dope quantities of active element(s) such that the absorption factor of the pumping light beam 3 in the gain medium far from the pumping light source 12 on the optical path is larger, the generated heat amounts by the gain media on different positions on the optical path can be equalized.

As a modification example of the embodiment shown in FIG. 5, the pumping light beam is not supplied through the incident side reflection mirror but may be supplied from the outside of the incident side reflection mirror. For example, the pumping light beam may be obliquely supplied from the outside of the incident side reflection mirror 5 by using a refractive index depending on the wavelength so as to form the zigzag optical path. In this case, the desirable result can be obtained by using Brewster's angle (polarization angle) to the wavelength of each of the laser beam and the pumping light beam.

Figure 6:
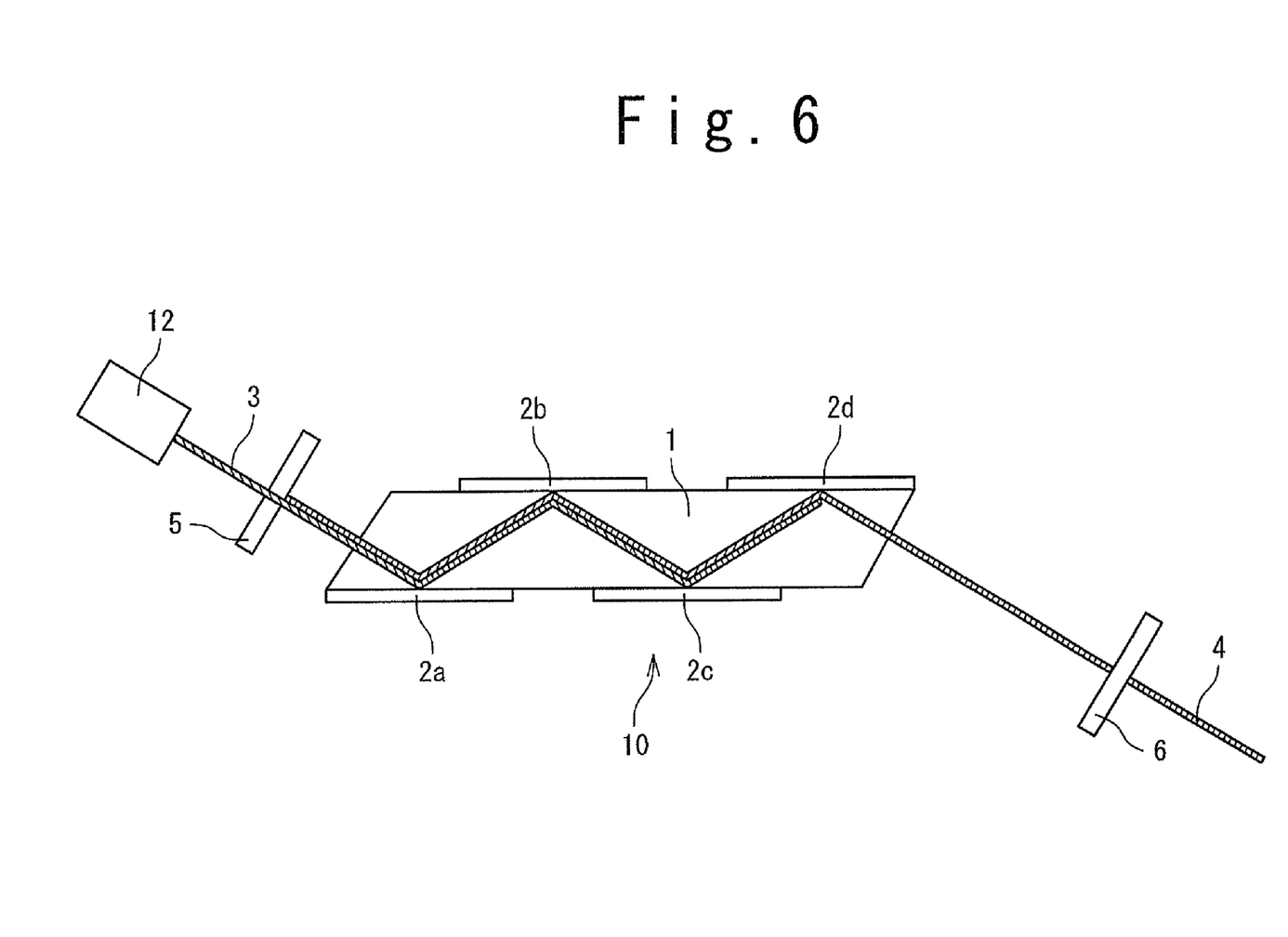
FIG. 6 is a diagram showing a modification of the laser oscillator in the first embodiment.

FIG. 6 shows the laser oscillator in a modification of the first embodiment. In this modification, four gain media 2a to 2d are joined on the top face 4b and the bottom face 4a by two by two. The side face of the laser gain medium 10 is a parallelogram. Even in this structure, the above-mentioned effect can be attained by using different gains of the gain media 2a to 2d.

[Second Embodiment]

Figure 7:
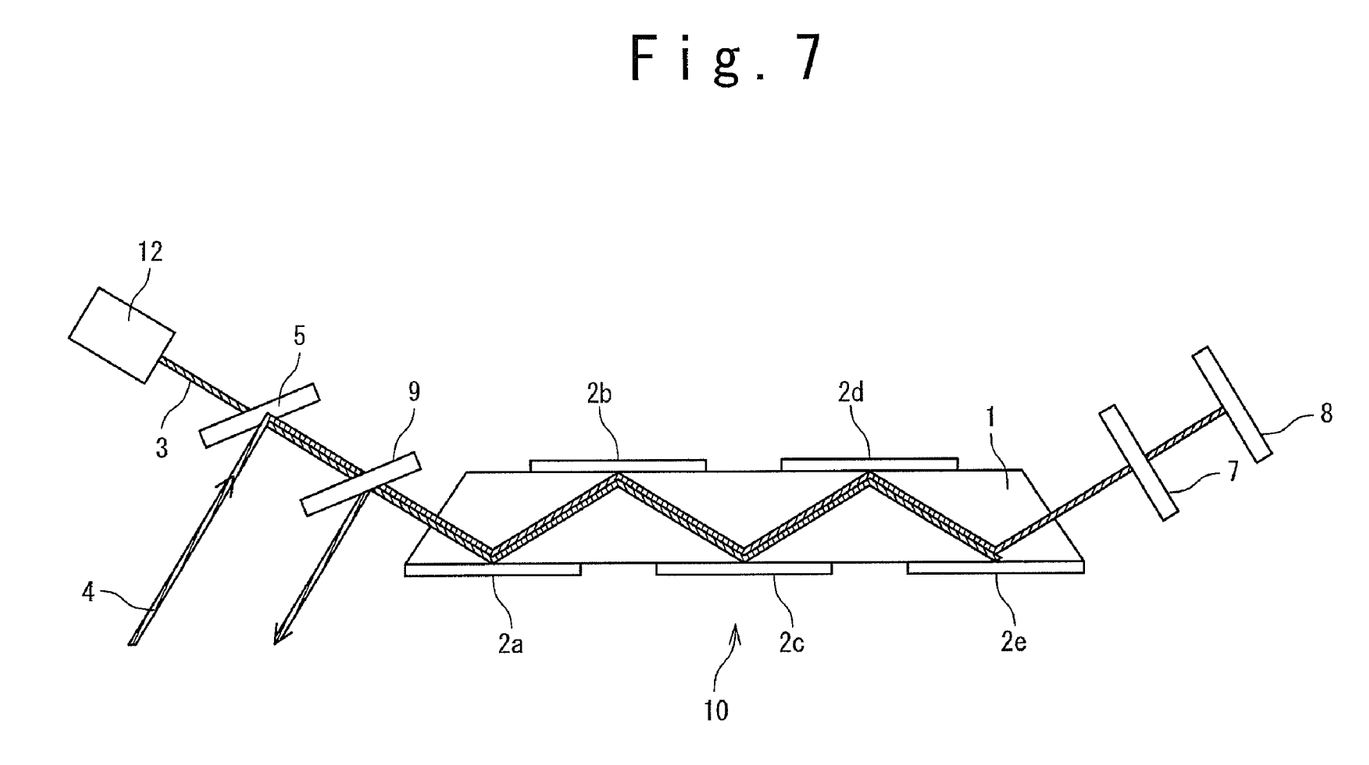
FIG. 7 is a diagram showing the structure of a laser oscillator according to a second embodiment of the present invention.

FIG. 7 is a diagram showing the structure of a laser oscillator according to a second embodiment of the present invention. The laser oscillator in the second embodiment can be realized by using the laser gain medium 10 shown in FIGS. 4 and 5. The laser oscillator is provided with the laser gain medium 10, the pumping light source 12, the laser beam full reflection mirror 5, a polarized light rotating device 7, a full reflection mirror 8, and a polarized light splitter 9.

The pumping light beam 3 outputted from the pumping light source 12 transmits through the laser beam full reflection mirror 5 and the polarized light splitter 9 and is incident into the laser gain medium 10 from the first end face S1. The pumping light beam 3 excites or pumps the gain media 2a to 2e. On the other hand, a laser beam 4 to be amplified is incident from the laser beam source 12 and is directed to the same optical path as the pumping light beam 3 by the laser beam full reflection mirror 5. The laser beam 4 to be amplified is amplified inside the laser gain medium 10 and the amplified laser beam is outputted from the second end face S2. The laser beam 4 is reflected by the full reflection mirror 8 and returns to the second end face S2. The polarized angle of the laser beam 4 is rotated or changed by a predetermined angle when passing through the polarized light rotating device 7 arranged between the second end face S2 and the full reflection mirror 8. The amplified laser beam 4 which is returned from the second end face S2 to the first end face S1 is directed to a direction different from the optical path on which the pumping light beam 3 propagates, by the polarized light splitter 9 and is taken out outside.

Figure 8:
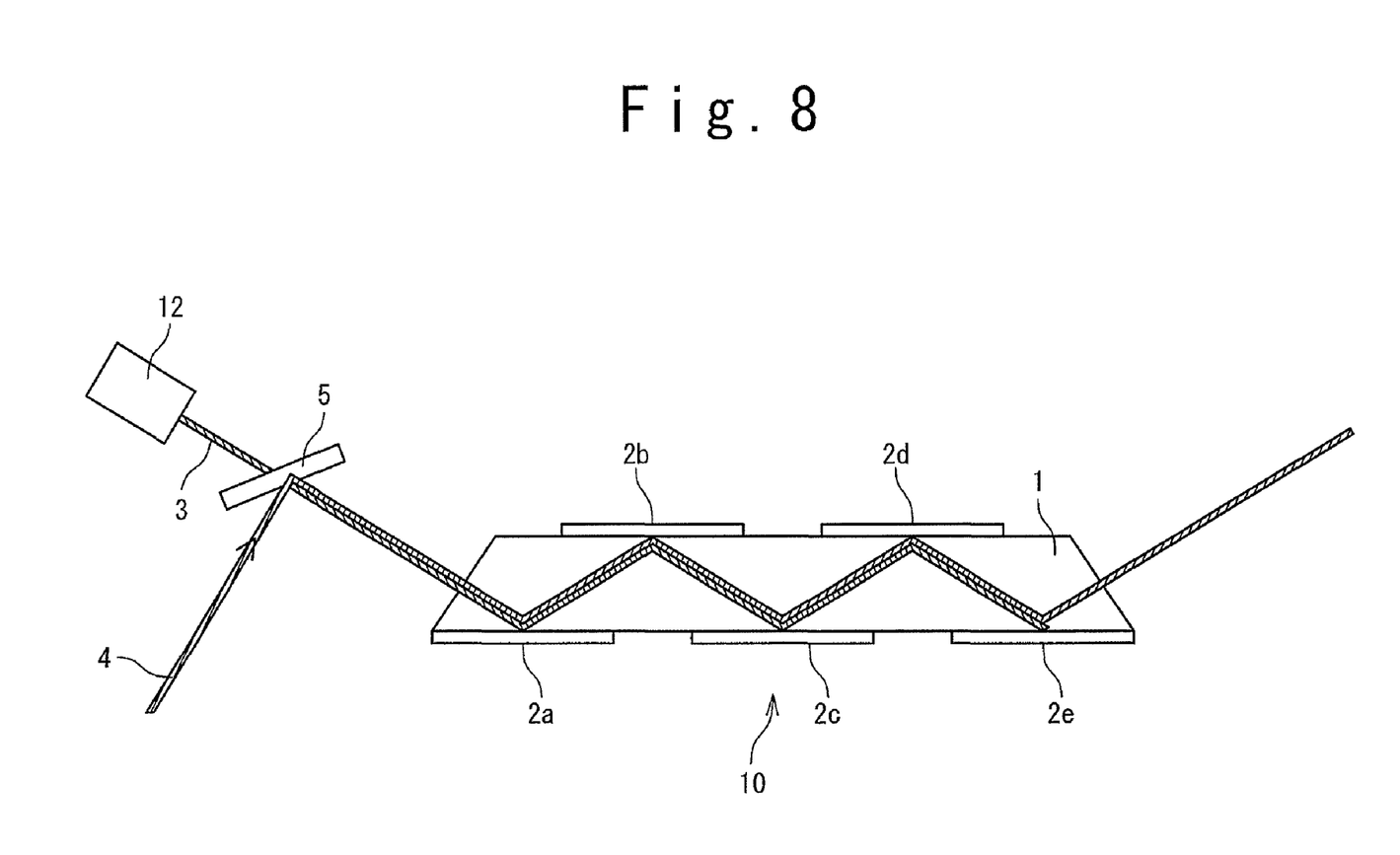
FIG. 8 is a diagram showing the structure of a modification of the laser oscillator in the second embodiment.

FIG. 8 is a diagram showing the laser oscillator having the structure which the polarized light rotating device 7, the full reflection mirror 8 and the polarized light splitter 9 are removed from the structure shown in FIG. 7 as another modification of the second embodiment. In this laser oscillator, the laser beam 4 is amplified inside the laser gain medium 10 and the amplified laser beam 4 is outputted from the second end face S2 without reflecting it by any full reflection mirror.

[Third Embodiment]

Figure 9:
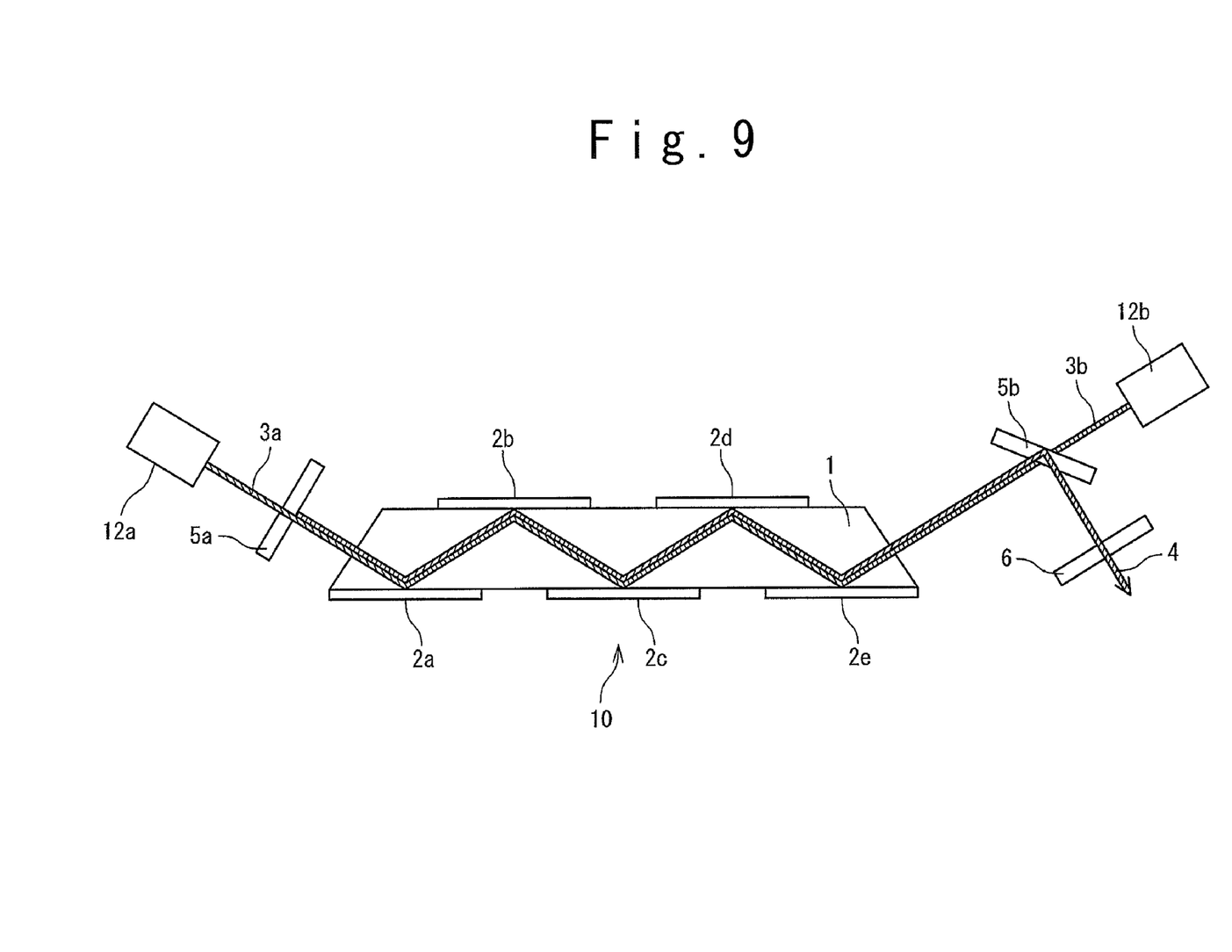
FIG. 9 is a diagram showing the structure of a laser oscillator according to a third embodiment of the present invention.

FIG. 9 is a diagram showing the structure of the laser oscillator according to a third embodiment of the present invention. The laser oscillator in this embodiment can be realized by using the laser gain medium 10 shown in FIGS. 4 and 5. However, the thicknesses and/or the dope quantities of the gain media 2a to 2e are adjusted such that the temperature rising of the gain media 2a to 2e is made uniform, when the pumping light beams 3a and 3b from a plurality of pumping light sources 12a and 12b are absorbed by the gain media 2a to 2e and the heat is generated through the absorption. The laser oscillator is provided with the laser gain medium 10, the pumping light sources 12a and 12b, the laser beam full reflection mirrors 5a and 5b, and the output mirror 6.

The pumping light source 12a outputs a pumping light beam 3a. The pumping light beam 3a transmits through the laser beam full reflection mirror 5a and is incident on the first end face S1 of the optical medium 1. The incident pumping light beam 3a forms the above-described zigzag optical path since it is alternately reflected by the gain media 2a, 2c and 2e on the bottom face 4a, and the gain media 2b and 2d on the top face 4b. The pumping light source 12b outputs a pumping light beam 3b. The pumping light beam 3b transmits through the laser beam full reflection mirror 5b and is incident on the second end face S2 of the optical medium 1. The incident pumping light beam 3b forms the same zigzag optical path as the pumping light beam 3a.

The pumping light beam 3a is led to a direction different from the optical path between the second end face S2 and the pumping light source 12b by the laser beam full reflection mirror 5b arranged between the second end face S2 and the pumping light source 12b. The output mirror 6 is arranged on the output path. The pumping light beam 3a and the pumping light beam 3b are fully absorbed by the gain media 2a to 2e of the laser gain medium 10 and generate fluorescence. The generated fluorescence resonates in the optical resonator between the laser beam full reflection mirror 5a and the output mirror 6 and is outputted as the laser beam 4 from the output mirror 6.

[Fourth Embodiment]

Figure 10:
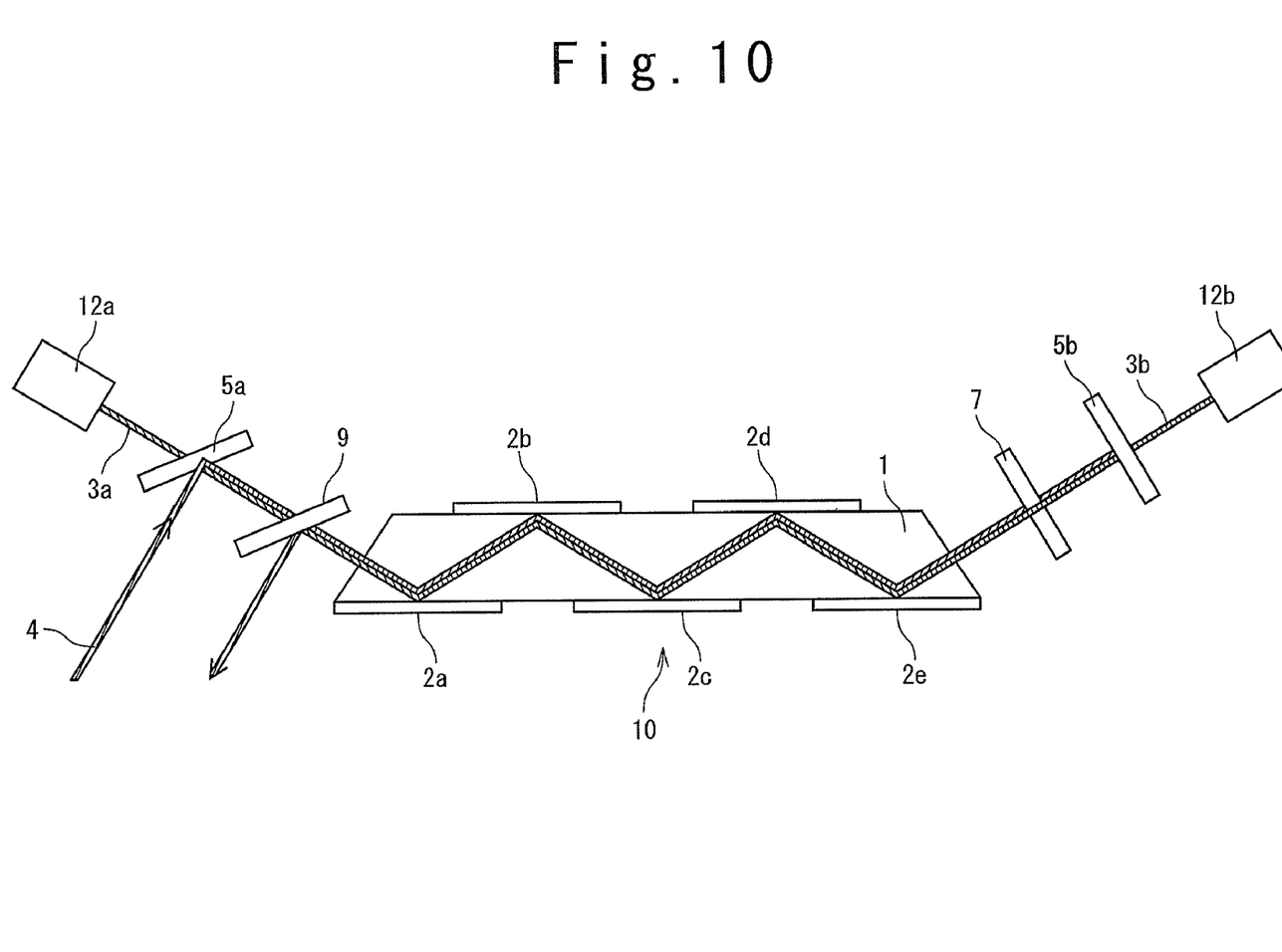
FIG. 10 is a diagram showing the structure of a laser oscillator according to a fourth embodiment of the present invention.

FIG. 10 is a diagram showing the structure of the laser oscillator according to a fourth embodiment of the present invention. The laser oscillator in this embodiment can be realized by using the laser gain medium 10 shown in FIGS. 4 and 5. However, the thicknesses and/or dope quantities of the gain media 2a to 2e are adjusted such that the temperature rising of the gain media 2a to 2e are uniform, even if the heat generated by absorption of the pumping light beams from the plurality of pumping light sources is given to each of the gain media 2a to 2e. The laser oscillator is provided with the laser gain medium 10, the pumping light sources 12a and 12b, the laser beam full reflection mirrors 5a and 5b, the polarized light rotating device 7, and the polarized light splitter 9.

In this embodiment, the pumping light source 12b is added, compared with the laser oscillator of the second embodiment. The pumping light beam 3b outputted from the pumping light source 12b transmits through the laser beam full reflection mirror 5b and the polarized light rotating device 7 and is led on the same optical path as the pumping light beam 3a outputted from the pumping light source 12a. The gain media 2a to 2e are excited or pumped by the pumping light beams 3a and 3b. Similar to the second embodiment, the laser beam 4 is led on the same optical path as the pumping light beams 3a and 3b, and is amplified by the gain media 2a to 2e and is outputted in a direction different from the optical path of the pumping light beams 3a and 3b by the polarized light splitter 9.

Like the first embodiment, in the laser system of the second to fourth embodiments, the temperature is adjusted to be uniform, by adjusting an absorption factor by using the gain media 2a to 2e. Therefore, it is possible to generate an amplified laser beam with high quality. Also, like the first embodiment, the heat generated in the gain media 2a to 2e can be efficiently removed by means of the cooling unit. It should be noted that the number of gain media, and the size of each gain medium are not limited to the above embodiments and may be determined based on the amplification and output.

Figure 14:
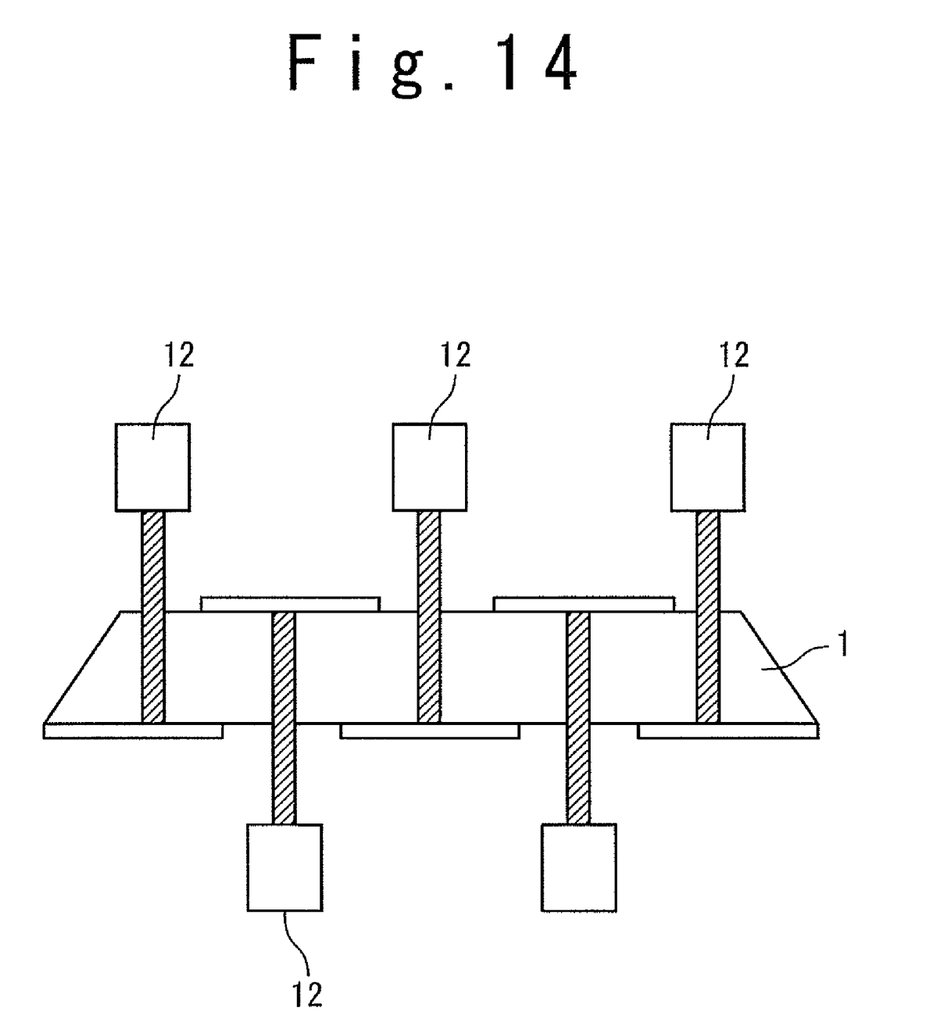
FIG. 14 is a diagram showing another pumping method of the laser gain medium.

It should be noted that in the laser system of the first to fourth embodiments, the pumping light beam is incident into the laser gain medium 10 through the end faces S1 and/or S2. However, as shown in FIG. 14, the pumping light beam may be incident into each of the laser gain media from a direction opposing to the laser gain medium independently from the other laser gain media. In this case, the same effects as the laser oscillator and the laser oscillator shown in FIGS. 4 to 10 can be obtained. In this case, the temperature rising in the gain media through the absorption of the pumping light beams is made uniform, by adjusting the thicknesses and dope quantities of the gain media.

The inventors adjusted the thicknesses and dope quantities of gain media 2a to 2e as follows:

(1) the gain media are adjusted such that the temperature rising of each of the gain media is uniform and is equal to or less than 20 K to a determined excitation power and a beam size, (2) the gain media are adjusted such that equal to or more than 99% of the pumping light beam is absorbed by the laser gain medium, and (3) when the laser beam goes and returns on one optical path inside the laser medium, the accumulated power can be efficiently extracted.

Figure 11:
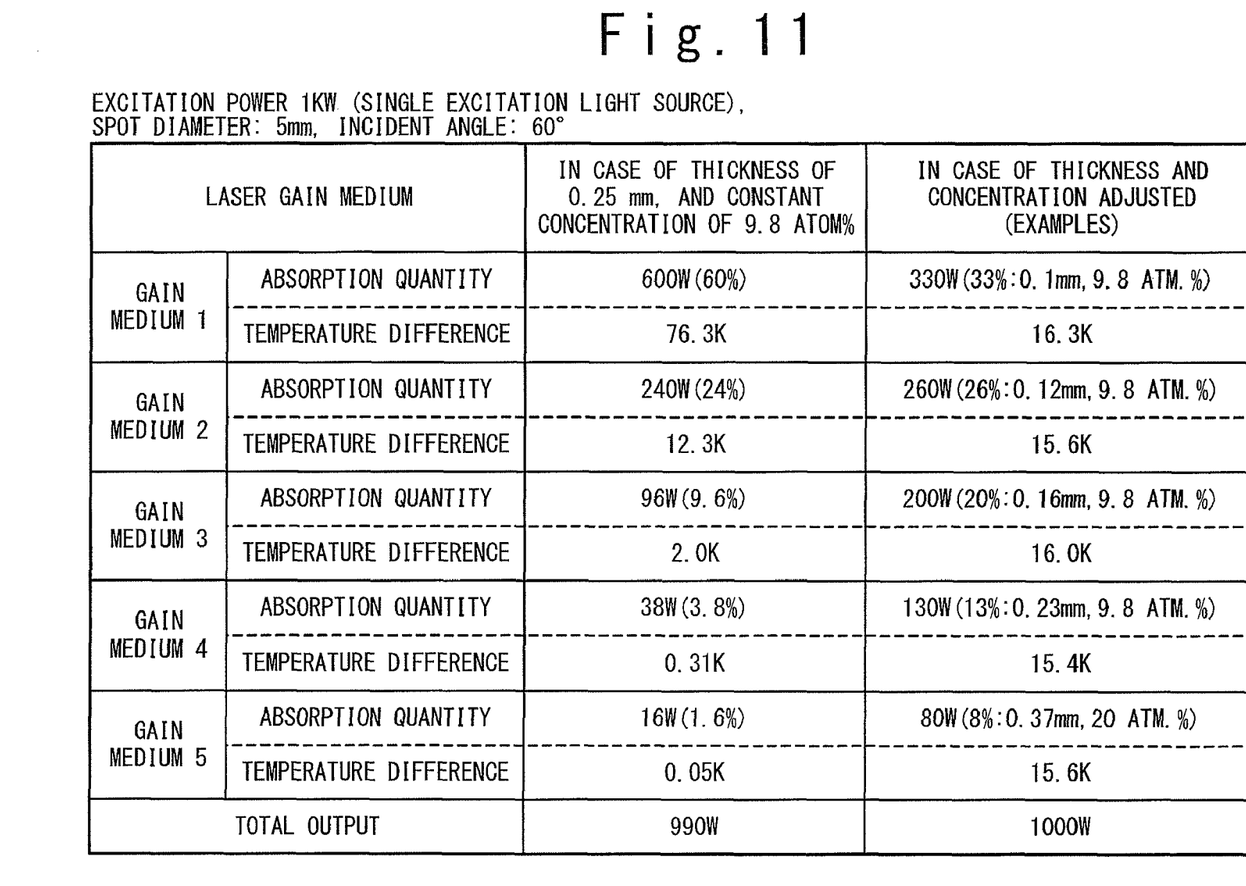
FIG. 11 is a table showing a result when adjusting the thickness and the dope quantity of a laser gain medium in case of one pumping light source.
Figure 12:
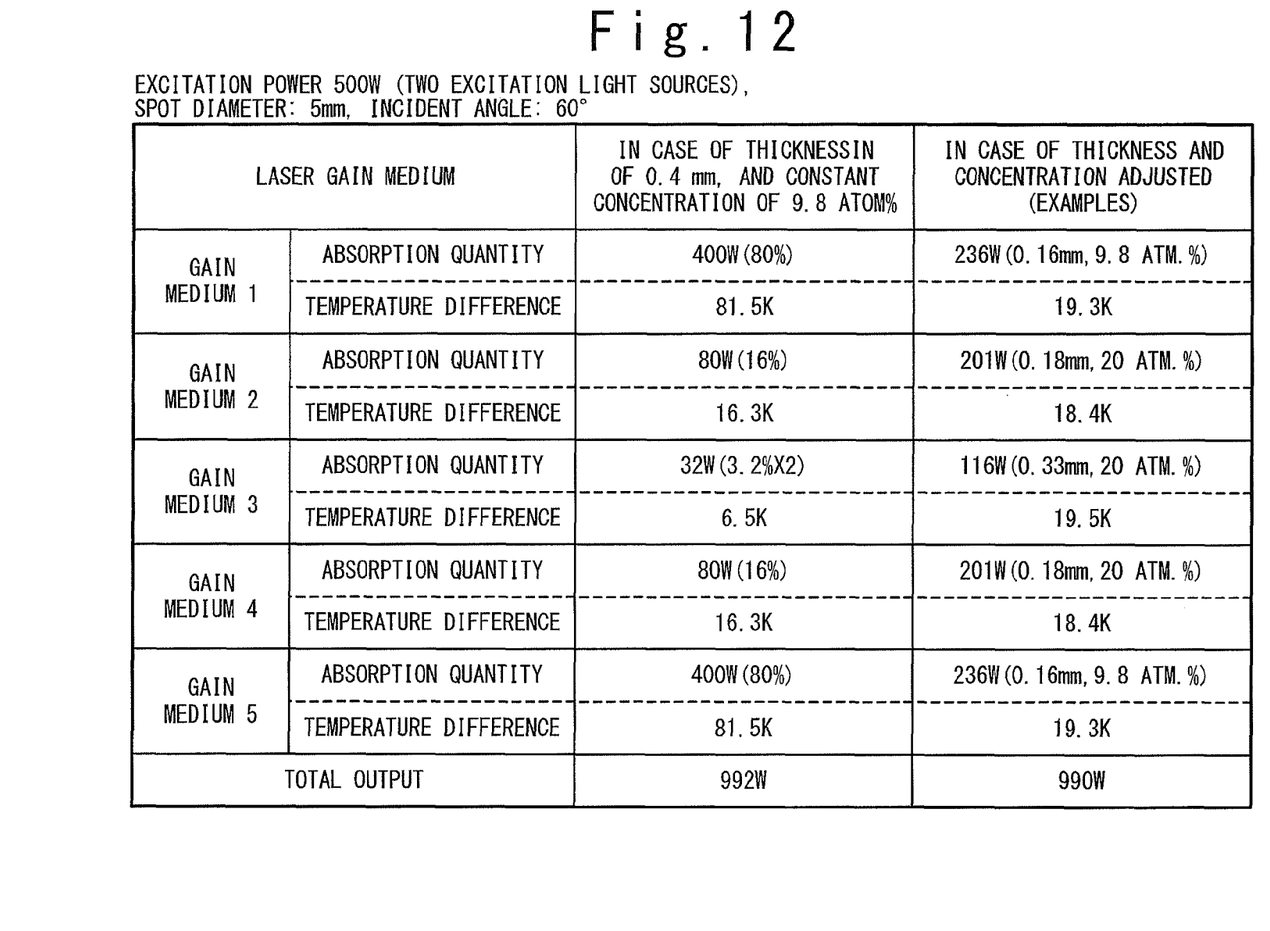
FIG. 12 is a table showing the result when adjusting the thickness and the dope quantity of the laser gain medium in case of the two pumping light sources.

FIGS. 11 and 12 show calculation results of a case that the thicknesses of gain media 2a to 2e and the doped concentrations of the active element(s) in the gain media 2a to 2e are constant and a case that the doped concentrations are adjusted. FIG. 11 shows a result in case of one pumping light source, and FIG. 12 shows a result in case of the two pumping light sources.

Figure 13:
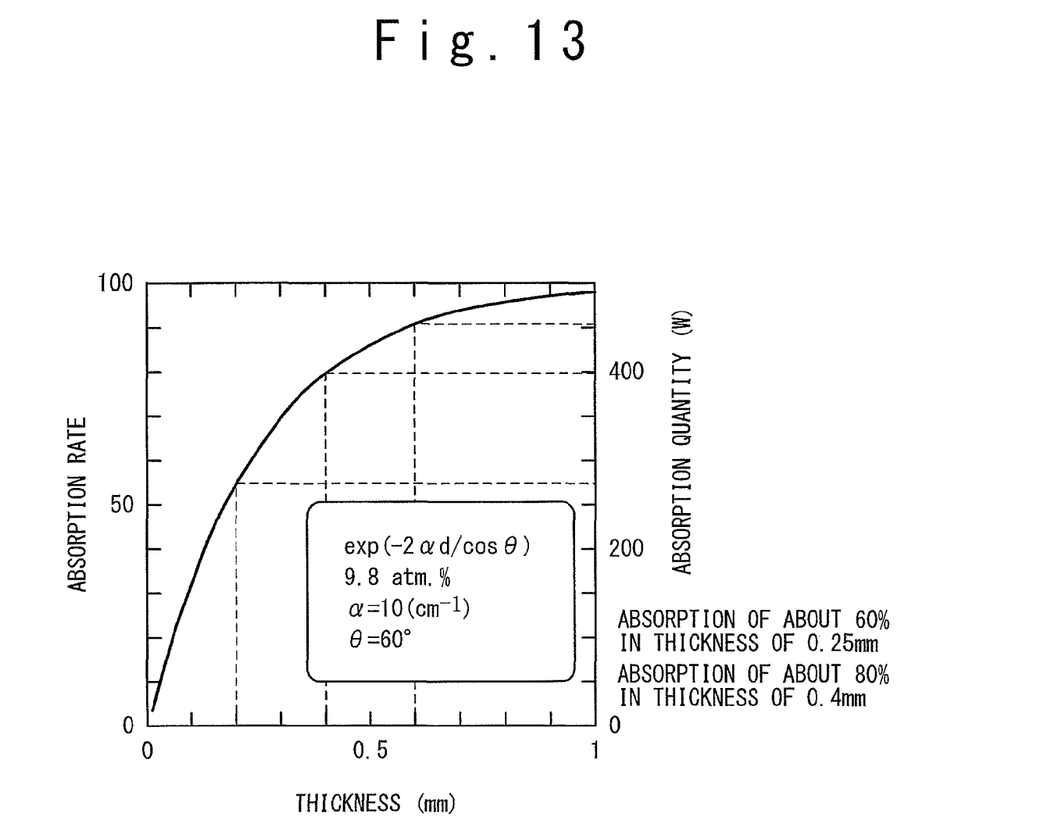
FIG. 13 is a diagram showing relationship of the thickness of each of gain media and the absorption factor of a pumping light beam.

FIG. 13 shows relationship of the thickness of each of the gain media and the absorption factor of the pumping light beam when the incident angle to each of the gain media 2a to 2e is 60 degrees. The vertical axis on the right hand side shows the absorption when a 500 W light source is used.

The temperature difference •T in FIGS. 11 and 12 is calculated as follows:

$$•T = Q \times d / \kappa \times S$$

where Q: a calorific power (W) (20% of the absorption)
d: the thickness of the medium (mm)
κ: the heat transfer rate (20 W/mK)
S: the face area of the beam (2r=5 mm).

What is claimed is:
1. A laser oscillator comprising:
an optical resonator having an input side reflection mirror and an output side reflection mirror;
a laser gain medium arranged between said input side reflection mirror and said output side reflection mirror; and
a pumping light source configured to supply a pumping light beam to said laser gain medium,
wherein said laser gain medium comprises:
an optical medium configured to transmit a laser beam and the pumping light beam and having an incident face, a first face, a second face opposing to said first face; and
a plurality of gain media pumped by said pumping light source and configured to amplify the laser beam while reflecting the laser beam, wherein said plurality of gain media are formed of same optical material and doped with at least one active element,
wherein ones of said plurality of gain media are joined on a first face of said optical medium as first face gain media, and the remaining gain media are joined on a second face of said optical medium as second face gain media,
wherein the pumping light beam is incident from said pumping light source into said optical medium through said incident face, and pumps up said first and second face gain media through an optical path while being alternately reflected by said first face gain media and said second face gain media,
wherein the laser beam is generated in said optical resonator, is propagated on the optical path and is amplified in said optical resonator by said first face gain media and said second face gain media, and
wherein at least one of (i) dope quantities of the active element into said plurality of gain media and (ii) thicknesses of said plurality of gain media in a direction perpendicular to the first or second face is adjusted such that an amount of heat generated by absorbing the pumping light beam is uniform over said plurality of gain media.

2. The laser oscillator according to claim 1, wherein an absorption factor of the pumping light beam of one of said first and second face gain media which is near to the incident face is smaller than that of the other gain medium which is distant from the incident face.

3. The laser oscillator according to claim 1, further comprising:
a cooling unit configured to cool said first face and said second face of said laser gain medium.

4. A laser oscillator comprising:
an optical resonator having an input side reflection mirror and an output side reflection mirror;
a laser gain medium arranged between said input side reflection mirror and said output side reflection mirror; and
a pumping light source configured to supply a pumping light beam to said laser gain medium,
wherein said laser gain medium comprises:
an optical medium configured to transmit a laser beam and the pumping light beam and having an incident face, a first face, a second face opposing to said first face, and
a plurality of gain media pumped by said pumping light source and configured to amplify the laser beam while reflecting the laser beam, wherein said plurality of gain media are formed of same optical material and doped with at least one active element,
wherein ones of said plurality of gain media are joined on a first face of said optical medium as first face gain media, and the remaining gain media are joined on a second face of said optical medium as second face gain media,
wherein the laser beam is generated in said optical resonator, is amplified in said optical resonator by said first face gain media and said second face gain media while being alternately reflected by said first face gain media and said second face gain media, and
wherein at least one of (i) dope quantities of the active element into said plurality of gain media and (ii) thicknesses of said plurality of gain media in a direction perpendicular to the first or second face is adjusted such that an amount of heat generated by absorbing the pumping light beam is uniform over said plurality of gain media.

5. The laser oscillator according to claim 4, wherein an absorption factor of the pumping light beam of one of said first and second face gain media which is near to the incident face is smaller than that of the other gain medium which is distant from the incident face.

6. The laser oscillator according to claim 4, further comprising:
a cooling unit configured to cool said first face and said second face of said laser gain medium.

7. A laser system comprising:
a laser gain medium;
a pumping light source configured to supply a pumping light beam;
a laser beam source configured to supply a laser beam to said laser gain medium;
a laser beam optical system configured to lead the laser beam to said laser gain medium; and
a pumping light beam optical system configured to lead the pumping light beam to said laser gain medium,
wherein said laser gain medium comprises:
an optical medium configured to transmit the laser beam and the pumping light beam and having an incident face, a first face, a second face opposing to said first face; and
a plurality of gain media pumped up by the pumping light beam and configured to amplify the laser beam while reflecting the laser beam, wherein said plurality of gain media are formed of same optical material and doped with at least one active element,
wherein ones of said plurality of gain media are joined on a first face of said optical medium as a first face gain media, and the remaining gain media are joined on a second face of said optical medium as a second face gain media,
wherein the pumping light beam is incident from said pumping light source into said optical medium by said pumping light beam optical system, and pumps up said first and second face gain media,
wherein the laser beam is incident from said laser beam source into said optical medium through said incident face by said laser beam optical system and is amplified by said first face gain media and said second face gain media while being alternately reflected by said first face gain media and said second face gain media, and
wherein at least one of (i) dope quantities of the active element into said plurality of gain media and (ii) thicknesses of said plurality of gain media in a direction perpendicular to the first or second face is adjusted such that an amount of heat generated by absorbing the pumping light beam is uniform over said plurality of gain media.

8. The laser system according to claim 7, wherein an absorption factor of the pumping light beam of one of said first and second face gain media which is near to the incident face is smaller than that of the other gain medium which is distant from the incident face.

9. The laser system according to claim 7, further comprising:
a cooling unit configured to cool said first face and said second face of said laser gain medium.

* * * * *